US006811486B1

(12) United States Patent
Luciano, Jr.

(10) Patent No.: US 6,811,486 B1
(45) Date of Patent: Nov. 2, 2004

(54) METHOD AND APPARATUS FOR ENHANCING GAME PLAY THROUGH SAVABLE GAME PLAY STATE

(75) Inventor: Robert Anthony Luciano, Jr., Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 10/139,300

(22) Filed: May 2, 2002

Related U.S. Application Data

(63) Continuation-in-part of application No. 09/788,168, filed on Feb. 15, 2001, now Pat. No. 6,758,757, which is a continuation-in-part of application No. 09/742,679, filed on Dec. 20, 2000.

(60) Provisional application No. 60/288,197, filed on May 2, 2001.

(51) Int. Cl.[7] .................................................. A63F 13/00

(52) U.S. Cl. ............................ 463/24; 463/16; 463/17; 463/18; 463/19; 463/20; 463/21; 463/22; 463/23; 463/29; 463/42; 463/43; 273/459

(58) Field of Search ........................ 463/13, 16, 20–22, 463/29, 26, 27, 14, 15, 17, 18, 19, 24, 42, 43; 273/138.1, 459

(56) References Cited

U.S. PATENT DOCUMENTS

| | | | | | |
|---|---|---|---|---|---|
| 5,265,874 | A | * | 11/1993 | Dickinson et al. | 463/25 |
| 6,007,426 | A | * | 12/1999 | Kelly et al. | 463/16 |
| 6,048,269 | A | * | 4/2000 | Burns et al. | 463/25 |
| 6,165,071 | A | * | 12/2000 | Weiss | 463/24 |
| 6,179,710 | B1 | * | 1/2001 | Sawyer et al. | 463/16 |
| 6,533,273 | B2 | * | 3/2003 | Cole et al. | 273/138.1 |
| 6,540,609 | B1 | * | 4/2003 | Paige | 463/20 |
| 6,592,456 | B2 | * | 7/2003 | Walker et al. | 463/13 |
| 6,605,001 | B1 | * | 8/2003 | Tarantino | 463/22 |
| 6,609,975 | B1 | * | 8/2003 | Sawyer et al. | 463/26 |
| 6,612,575 | B1 | * | 9/2003 | Cole et al. | 273/138.1 |

* cited by examiner

*Primary Examiner*—John M. Hotaling, II
*Assistant Examiner*—Yveste Cherubin
(74) *Attorney, Agent, or Firm*—Russ F. Marsden

(57) ABSTRACT

A system and method for maintaining player's enhanced game play state in a gaming environment is disclosed. In particular, the player may restore enhanced game play states from previously played games either from the same game device or from another game device, the enhanced game play states typically being enhancements to casino games and including reel nudges, alternate pay table use, and the like.

7 Claims, 10 Drawing Sheets

Prior Art Gaming Machine
Slant-top Style

Savable Game Play State System With Optional Back End State Event Validation Device Example Voucher Savable/Transferable Game Play State In A Casino Environment

FIGURE 5

Partial List Of Transferable Enhanced Game Plays (Game Play States)

| | |
|---|---|
| Add Paylines | Hold Reels(s) |
| Bonus Play Enhancement | Payline Pay Multiplier |
| Bonus Play Invocation | Reel Nudge, Up/Down |
| Change Paytables For Primary Game(s) | Respins |
| Change Paytables For Secondary Game(s) | Redraws |
| Change Paytables For Bonus Game(s) | Symbol Substitution |
| Hold Card(s) | Wild Symbol Enablement |

Game Play State Service Station

Example Use Of Savable Game Play State Service Station

Awarding And Usage Of Enhanced Game Play States

Game State Saving Game

Game State Saving Game
With Skill Points

METHOD AND APPARATUS FOR ENHANCING GAME PLAY THROUGH SAVABLE GAME PLAY STATE

RELATED APPLICATIONS

This application is a continuation in part of application having Ser. No. 09/788,168, now U.S. Pat. No. 6,758,757 filed 15 Feb. 2001, which is a continuation in part of co-pending application having Ser. No. 09/742,679, filed 20 Dec. 2000; this application further claims the benefit of provisional application 60/288,197 filed on 2 May 2001.

BACKGROUND OF THE INVENTION

1. Field of the Invention

This invention pertains generally to casino gaming systems. More particularly, the present invention relates to a method and apparatus enabling a player to keep and restore specific game enhancing changes, called transferable game play states, between game sessions and between games.

2. The Prior Art 2.1 Prior Art Gaming Machines And Game Play

Casino gaming machines, typically slot machines, have been in use for many years. FIG. 1 shows one general style of prior art gaming or slot machine, called a slant-top machine (the other most popular style is the upright). Shown is a front view 100 and a side view 116. Candle 102 lights when there is a machine fault (including a machine running out of tokens or coins to pay a cash-out), or a monetary prize over a certain amount to be awarded. Area 104 is typically art for the game, and is usually passive. There is a monetary input slot 106, which is typically a bill acceptor. Monetary input slot 106 may be, or may include, a coin acceptor. Coin acceptors are typically found on older machines or machines having lower-end betting amounts ("penny" or "nickel" slots). Slot area 110 typically comprises a glass cover having opaque art applied, with windows 108 through which a player views individual reels. Alternately, slot area 110 and slot windows 108 may together be a video screen, showing simulated reels and reel spins. Finally there are a set of player input devices, typically simple buttons, shown as buttons 114. Side view 116 shows the slanted portion of the machine (thus the general name "slant top"), which has the game viewing area 110 and slot viewing windows 108 (or video screen) and monetary input device(s) 106. On newer machines, there will typically be either one or two small numerical displays, shown as 118. One display shows the player the number of game credits they have, the other (if present) may show some kind of bonus point number, progressive jackpot amount, or may simply have simple scrolling letters advertising the casino. These displays may be found almost anywhere on a gaming machine that is visible to a player.

Game play and underlying game functionality for prior art slot (and other) gaming machines, such as that described above, is well known. A description of play and internal functionality may be found in such books as: "The Slot Machine Answer Book: How They Work, How They've Changed and How to Overcome the House Advantage" by John Grochowski, ISBN #1566251206; "The Casino Answer Book" by John Grochowski, ISBN #1566251079; and, "Break The One-Armed Bandits!" by Frank Scoblete, ISBN #1566250013. These books are incorporated herein by reference.

There are several common aspects to the game play and internal functionality of gaming machines currently in use.

One common aspect is that the outcome of each "game", that is, one handle pull or a touch of the "play" or "spin" button (depending on the game), or one spin of the physical or virtual reels, is based on a random event. In modern gaming machines containing microelectronics, there is a random number generator (RNG) which generates sequences of random numbers, upon which the visual display of reel outcomes (or other play, such as poker cards) and the results of the play (a player's winnings, including no win) is based. Also involved are the pay tables of the machine, as further described in the above referenced books. Each game play or game sequence is a unique event, having no relationship between one play and the next (i.e., they are independent events from a probabilistic standpoint).

Basic game play has been enhanced in several ways over the years. Those enhancements fall into two categories. The first is a bonus game, event, or winning; the other is the progressive jackpot. Each is briefly described below.

The bonus games fall into two subcategories: a single-event bonus game or bonus win; and, the investment-style bonus game. In the single-event bonus game or bonus win, upon the occurrence of a specified event in the primary game a bonus win or bonus game is invoked. Whatever the bonus is (i.e., spinning a wheel, picking a fisherman who "reels in a bonus", a scatter pay bonus, etc.), the extra play is finished and awarded (typically a multiplier of a base winning amount in the base or primary game) in a single sequence and the player is returned to the base game. Once the player is back to the base or primary game, the only effect of the bonus play is the addition of more credits on the credit meter. The bonus play and any award (winnings) is a singular event, ending with any additional credits being awarded.

An gaming machine having an investment bonus is characterized by having way of storing, in the machine, a counter corresponding to the occurrence of specified events from the primary game. After the counter reaches a specified count, the current player is awarded a bonus (additional game credits). Typically, the counter is shown to the player in a graphical form. An example of an investment bonus game is Bally's® Blazing 7's®. As the player plays and 7's appear in various positions on the virtual reels, a 7's counter is incremented. The 7's counter is presented to the player as a string of 7s in a row towards the top of the player viewing area. The player wins a bonus when the specified number of 7's is reached. This is shown to the player as "filling up" a row of 7s.

The bonus game is independent of who is playing. Thus, a common player strategy is to find an investment bonus game already having a significant amount of the bonus count in place, having been won or built-up by other players (see, for example, "The Slot Machine Answer Book: How They Work, How They've Changed and How to Overcome the House Advantage" pages 115–120). The smart player will get the extra bonus sooner than playing a game with no previous bonus count; alternatively, leaving a bonus count to be taken over by another player is frustrating to the player leaving the game.

The other general type of bonus is a jackpot that builds over time, funded by taking a small portion of each bet (play). Called a progressive jackpot, it may be funded and awarded on a single machine or may be funded and awarded within a pool of machines. Having a pool of machines contribute to a progressive is most common, as it enables the progressive jackpot to get significantly larger than would otherwise be possible (due to the larger number of individual machines making percentage-of-play contributions).

There are severe limitations with both types of game enhancements. One important limitation is that a player cannot continue any type of on-going bonus count accumulation that spans more than one specific gaming machine, or spans more than one non-sequential set of game plays on one or more specific gaming machines. Another problem is that there is no way to restore a secondary game or bonus game to a specified configuration. The prior art enables a secondary or bonus game to be in one of two configurations: (i) the base or starting state; or, (ii) an "as-found" state or configuration, being the result of some amount of previous play from previous players, the previous player(s) having incremented some type of bonus counter or having partially completed a bonus game such as Bally's Blazing 7s (otherwise the bonus game would be in its initial or base starting state).

Recently there have been some additional enhancements over the older prior art, one such improvement being to enable a player to save prize credits (credits usable for prize redemption rather than game play). A player can save prize credits to a read/write media, and the re-insert the media into a gaming device enabled to recognize the data on the read/write media and the prize credit meter (a counter, being a display showing a number to the player) will be set to the number (amount) of prize credits that were on the read/write media. Prize credit saving can be found in U.S. Pat. No. 6,007,426 to Kelly et al., entitled "Skill Based Prize Games For Wide Area Networks". Another recent patent related to gambling, but not the gaming machines of the present invention, is U.S. Pat. No. 6,165,071 to Weiss. Weiss which discloses a gambling machine that uses a smart card to save on-going sports data (i.e., hockey game results, football game results, baseball game results), so that a player can use the results of an on-going season's games to make on-going bets in Sports Book bars and the like. The Weiss patent teaches the use of smart cards (or memory cards) because of the relatively large amount of data that needs to be stored by sports fans. Weiss further teaches betting based on non-random events (betting on sports events is based on the game play, player injuries, and the like) and teaches away from random event games such as found in casinos, Amerindian gaming or bingo halls, and the like.

2.2 Prior Art Gaming System Infrastructures

There is currently no prior art gaming systems infrastructure that supports, allows, or would enable a player to overcome the problems identified immediately above; that is, to set the configuration of a game in a predetermined way or to save a player's investment in an investment bonus game over multiple individual gaming machines or over non-contiguous game playing sessions.

The existing gaming system infrastructures include the following. In small establishments, individual gaming machines (i.e., not networked) will take as input either coins, tokens, or bills, and will give out, upon a winning event, coins, tokens, or a printed payout ticket. In the event a player gets tokens or a printed payout ticket, the player must take the token or ticket to a cash-out booth, where a cashier exchanges them for cash (US currency).

In larger establishments, the gaming machines are networked together. Typically, the network comprises a serial connection between each individual gaming machine and a floor controller or game controller. The controller will act as an interface between banks of individual gaming machines and a more standard backend computer network (amongst other possible functionality, such as sometimes controlling a linked progressive jackpot or other game related functionality). The controller then interfaces to one or more computers on the backend network. Those computers will usually have two databases on separate machines; one works as a player comp database for players who use a plyer identification card, and the other is an accounting database for the casino. Typically these databases are independent from each other.

Coupled with the recent rise in non-Nevadan gaming installations has been increasing interest in alternatives to cash-only gaming machines. There are several typical forms this takes. One standard solution is to replace cash with tokens issued by the casino. The player exchanges cash for tokens upon entering the casino, and them must "cash-out" any tokens they have left when they leave.

Another solution is to couple some kind of cash deposit account with a traditional player ID account on a backend computer with a database. The player then uses their player ID card at a gaming machine, which enables the player to transfer monetary credits from their deposit account on the backend computer to the gaming machine as game play credits. See, for example, U.S. Pat. No. 5,265,874 to Dickinson et al., "Cashless Gaming Apparatus And Method", which discloses one particular implementation of this type of system for casinos.

Another solution involves the use of tickets or vouchers for use in the gaming machines, where a player inserts a ticket or voucher, receives game play credits, and then receives a "pay-out" ticket or voucher at the end of play. The vouchers or tickets, as disclosed in U.S. Pat. No. 6,048,269 to Burns et al., "Coinless Slot Machine System And Method", allows players to use currency in the form of bills (no coins) to get game credits, or to insert a voucher. If a voucher is inserted into the gaming machine, the voucher is verified on a backend computer, and the backend computer issues instructions to the gaming machine to set its credit meter accordingly. The gaming machine does not interpret or interact with the data on the voucher, that is all handled by the backend computer.

Mention is also made to U.S. Pat. No. 6,007,426 to Kelly et al. The Kelly patent teaches a system for prize redemption in a skill-based arcade setting, where a game user wins award credits as they play a game (similar to winning points on arcade games). The player saves the prize credits on the machine as game play continues, until they wish to redeem the prize credits for a prize. Prior to Kelly, game players were issued tickets (called universal prize tickets in Kelly) that were then taken to a counter and exchanged for prizes. Kelly teaches that a player may redeem their prize credits through the use of an on-line menu-driven system where the player sees pictures of items, indicates what item they want, the equivalent number of prize credits (the "prize credit cost" of the item) is subtracted from their total, and the player is either given the prize or is given what Kelly calls a "specific prize ticket", that is, a ticket redeemable only for a single prize. Thus, Kelly teaches a way of redeeming prize credits for specific items in a manner more efficient than previously used in arcade settings by substituting the collection of general tickets and going to a counter for prize credits and the use of a video-based menu system. Kelly does not disclose or teach anything applicable to the enhancement of the game play itself (rather than redemption) in arcades nor any other setting.

There is a need to overcome the limitations found in the prior art that preclude players from becoming involved in longer-term and related game plays spanning more than one game session and more than one game.

BRIEF DESCRIPTION OF THE INVENTION

The present invention provides for methods and apparatus to save and restore enhanced game play states for players using games in a traditional casino gaming environment, and similar environments such as Amerindian casinos, bingo halls, etc. Game features that are enabled for use with the present invention include, but are not limited to, reel nudging, alternate pay tables, replacement game symbols, holds, and bonus plays. Called savable/transferable enhanced game states, the states that may be saved are any of the ones just mentioned but further including any that are, or in the future may be, enabled by the game itself. This includes partially completed skill-based or apparent-skill-based game results when those games are used with random-event based games.

BRIEF DESCRIPTION OF THE DRAWINGS

FIG. 5 is a diagram of savable and transferable enhanced game play states in accordance with the present invention.

DETAILED DESCRIPTION OF PREFERRED EMBODIMENTS

Figure 1:
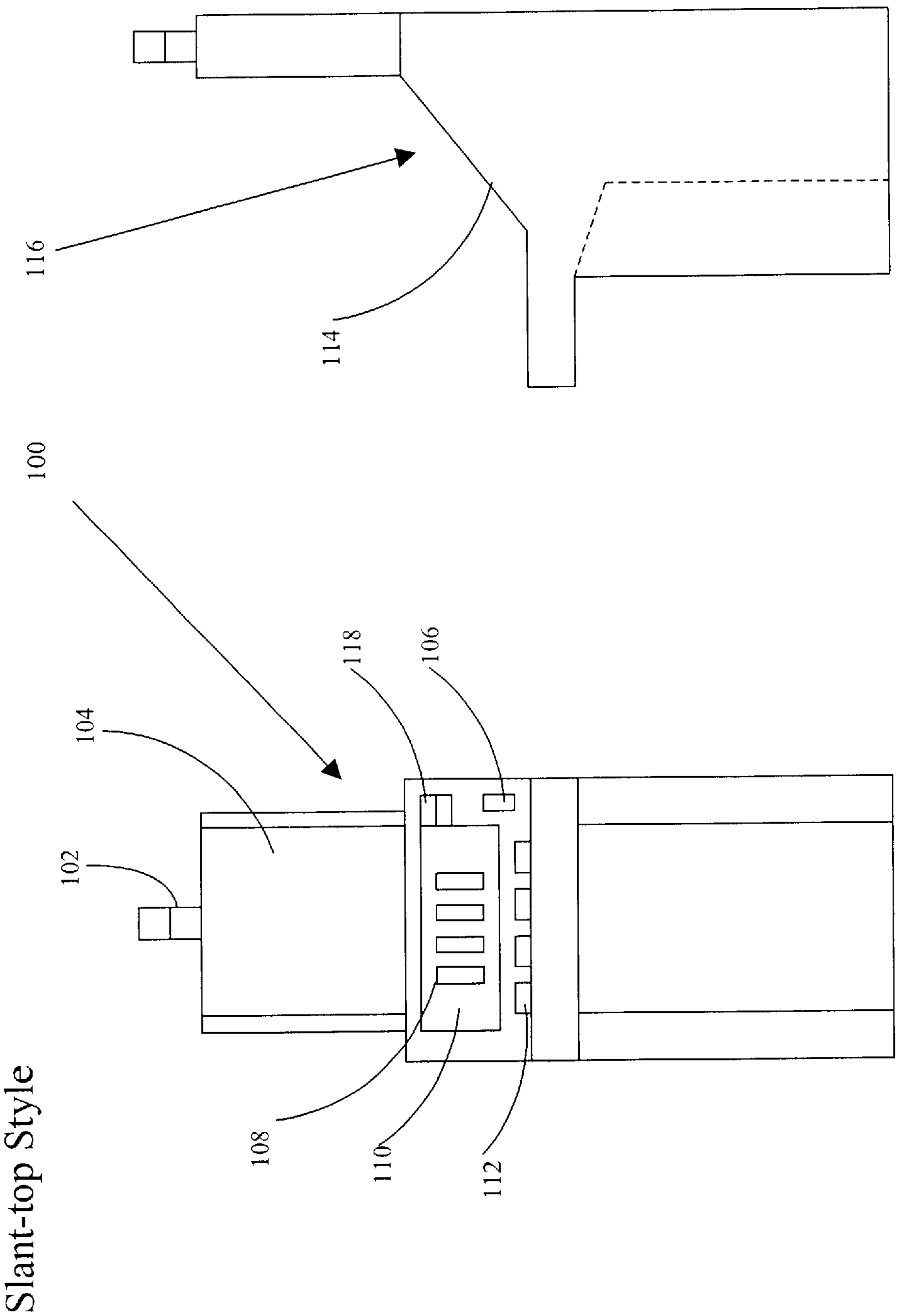
FIG. 1 is a functional block diagram of a prior art game machine.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 2 through FIG. 10. It will be appreciated that the apparatus may vary as to configuration and as to details of the parts, and that the method may vary as to details and the order of the acts, without departing from the inventive concepts disclosed herein.

Figure 2:
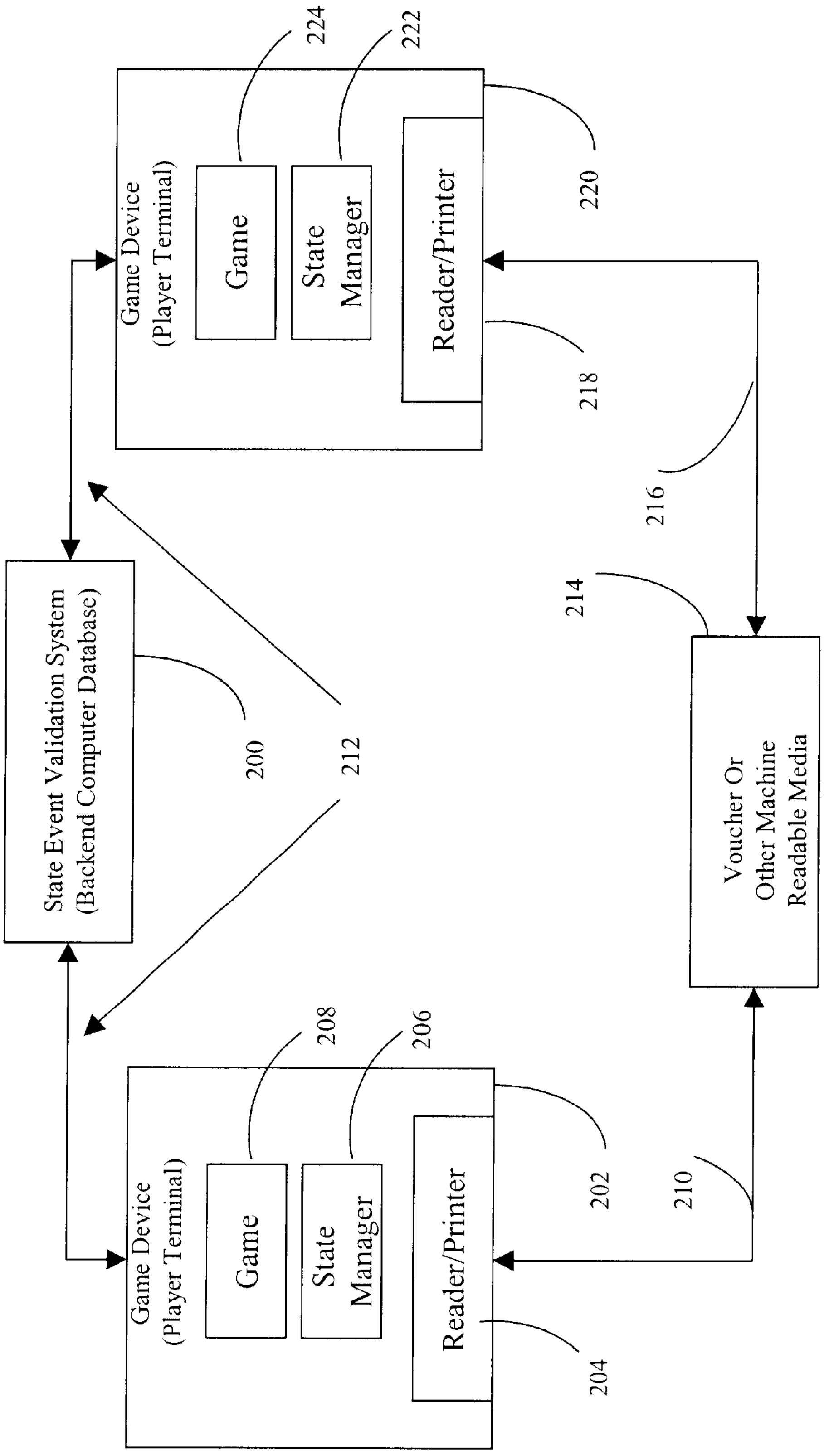
FIG. 2 is a functional block diagram of an example game system according to the present invention.

FIG. 2 illustrates a system according to the present invention. Player terminal or game device 202 and 220 have therein the typical components found in a gaming machine on casino floors, including the game software and hardware 208 and 224. Two player terminals are shown for illustrative purposes; any number may be used. Further shown are reader/printers 204 and 218. Reader/printers 204 and 208 are the readers of machine readable indicia (such as bar code on a voucher) or media (such as a magnetic strip on a card), as used in the casino in which the player terminal are installed. Further, reader/printers may be IR or RF ports, or other interfaces to hand-held devices used by players of casinos. Reference to printers is further understood to be a compatible form with the readers in use with any particular installation. For example, if the reader is a voucher reader, then the printer is a voucher printer. If the reader is an RF port receiving signals from a hand-held device used by a player, then the printer refers to the transmission of RF signals in a manner receivable by the same hand-held device. Further included in player terminals 202 and 220 are transferable game state managers (a.k.a. state managers) 206 and 222. State managers 202 and 220 will typically be implemented in software, operating with the traditional game software. In the near future, as transferable game states become implemented in new games rather than retrofitted to existing games, it is also expected that there will be additional hardware to support transferable game state implementations. State managers 202 and 222 are configured to read any transferable game play state (game state, transferable game state—all refer to the same states which functionally enable a game to be set to a specific game play enhanced state as compared to the game's base state, or normal starting state, using saved and transferred game state information) that is found on voucher 214. Voucher 214 is inserted into reader/printer 204 or 218, typically having bar code thereon and read by a bar code reader, after which the read information is parsed and game state information sent to the state manager.

The state manager then uses the information to set the game state. The game state will be some form of game play that is beyond that found in the game's base, or normal, starting state. For example, a normal starting state on a reel slot machine is to have certain symbol combinations on the reels yield certain winnings. An enhanced game play state is one in which certain symbols on the reel strips are designated as "wild symbols", where the appearance of that symbol on one reel strip enables the remaining symbols to be combined to yield the highest possible payback to the player, with the wild symbol taking the place of any other symbol needed to make the high paying combination. The voucher 214 would have a numerical indicia that, when read by the state manager, would tell the state manager to set the wild symbol as enabled for the next game play. This is a state that is not normally available at the start of game play (ordinarily it would occur after the occurrence of a random event).

Also shown are network connections 212, coupled to a backend database on a server 200. The network and backend system 200 are not needed for every installation of the present invention. Player terminals having state managers may use vouchers (or other input means) to transfer game state between different player terminals, not needing to be networked thereby. Alternatively, networked player terminals may use a backend database to record saved game state along with a unique identifier, typically composed of a machine ID (which game machine the state was saved from) coupled with a time stamp (typically having a granularity down to 1/100's of a second, enabling unique IDs to be created therefrom), and further often being encrypted before being printed on a voucher or otherwise provided to a player. This unique ID is used to retrieve the transferable, savable game state associated with that ID. In one preferred embodiment, a player is issued a voucher that has a unique ID (preferably encrypted) printed with machine readable indicia thereon, which the player then insets into a reader at a later time and typically on a different player terminal.

The ID is read, decrypted (decrypting is optional; the decrypting may take place on the player terminal or the backend server), and the resultant identification number used to retrieve saved transferable game play state and send it to the player terminal where the voucher was inserted into the reader. The database is either purged of that entry (after confirmation from the player terminal the data was received) or is tagged as not current (to prevent duplicate vouchers from being used), coupled with a time stamp and the player terminal to which the data was sent (in case a player controversy arises, allowing tracing of the data's use).

Figure 3:
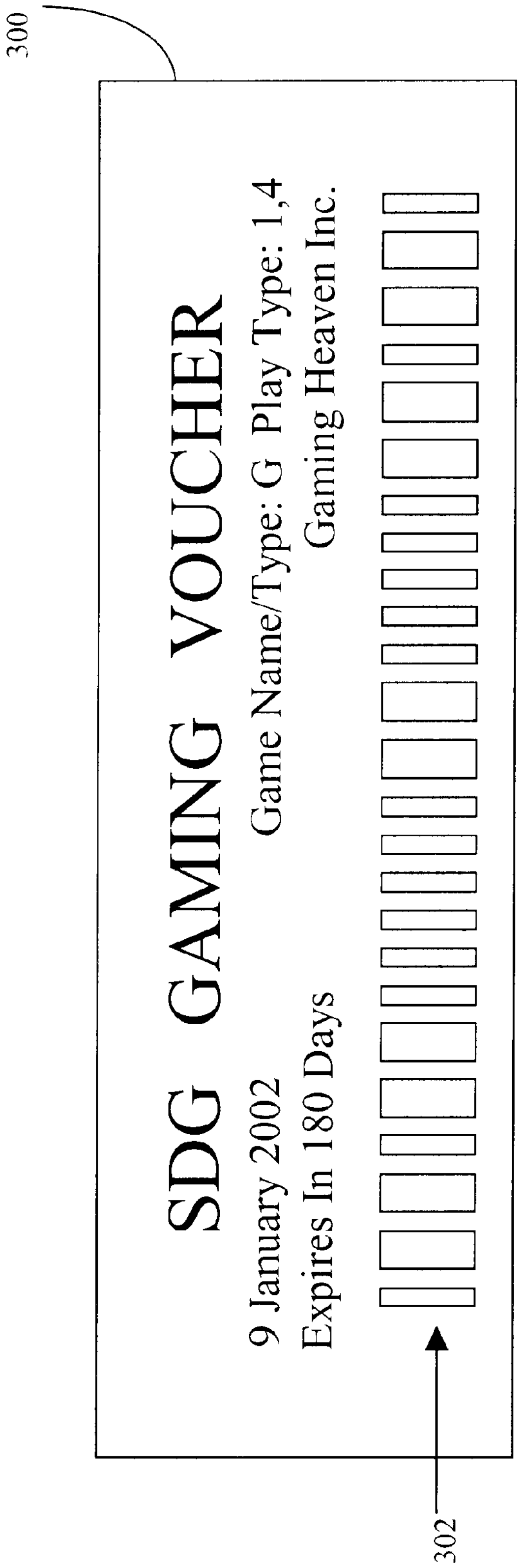
FIG. 3 is an example voucher in accordance with the present invention.

FIG. 3 shows an example voucher for use with the present invention. Voucher 300 has imprinted thereon bar code 302. Barcode 302 has, in machine readable form, the information presented to the player in human readable form on the voucher. This includes, but is not limited to, the issuance date, expiration date, game or game type for which this voucher is applicable (different gaming machines will have different types and kinds of savable, transferable game play state—note that many different games, implemented on the same "box" or gaming machine may have the same set of savable, transferable game play states such as "reel nudge" or "wild symbol"), and which of the possible game states are actually saved on this voucher.

Figure 4:
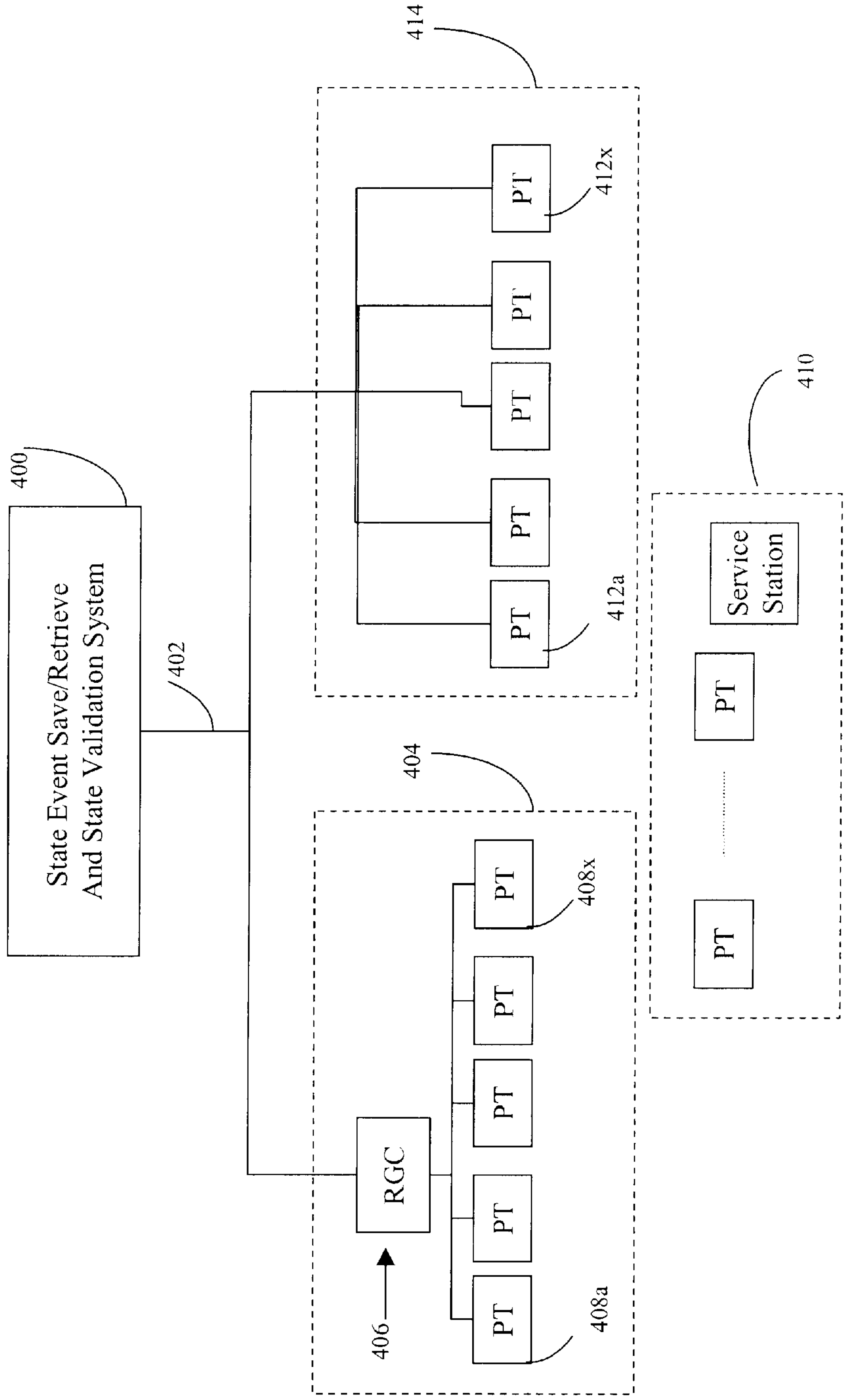
FIG. 4 is a block diagram of several system configurations suitable for use with the present invention.
Figure 6:
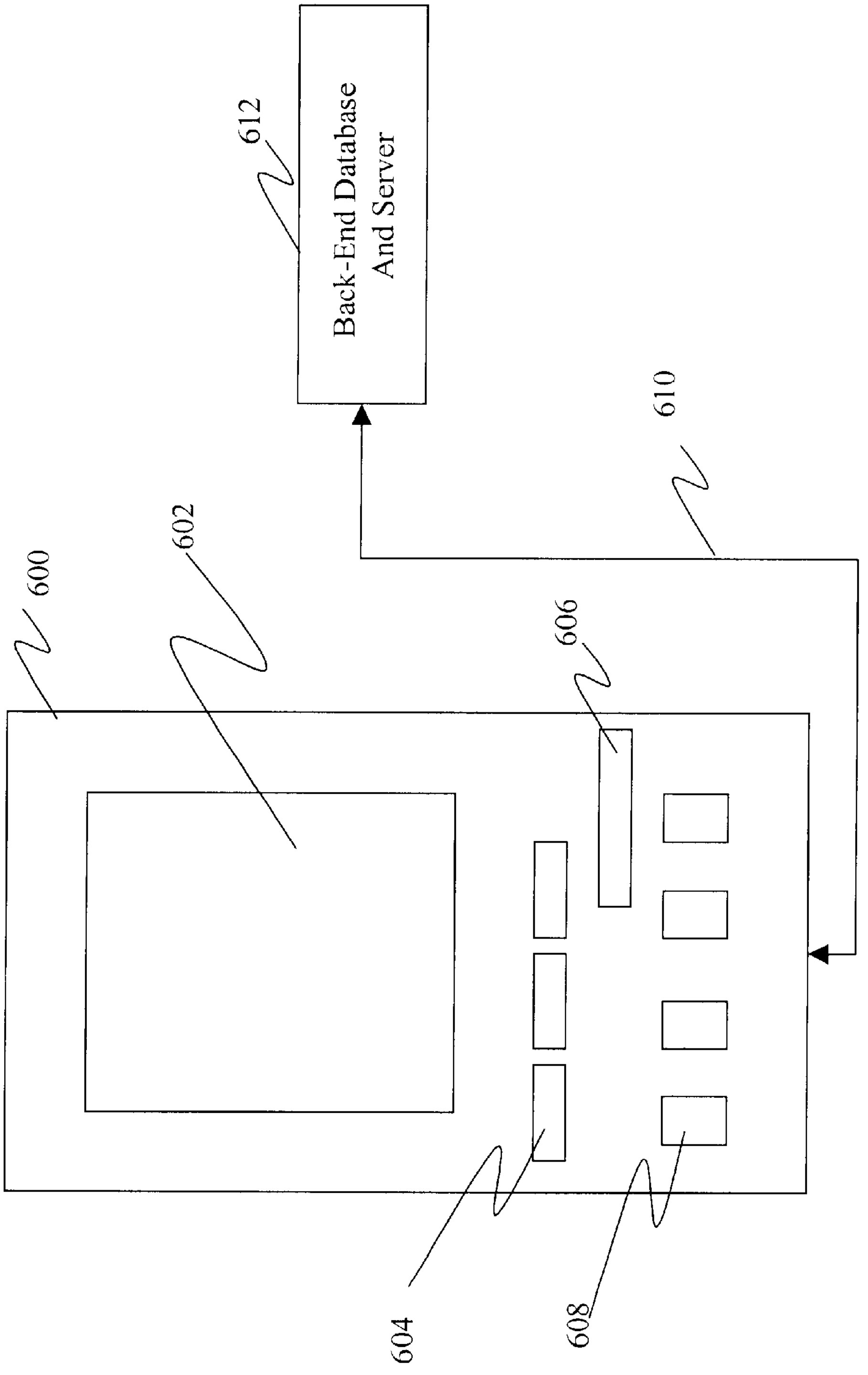
FIG. 6 is a functional block diagram of a service station in accordance with the present invention.
Figure 7:
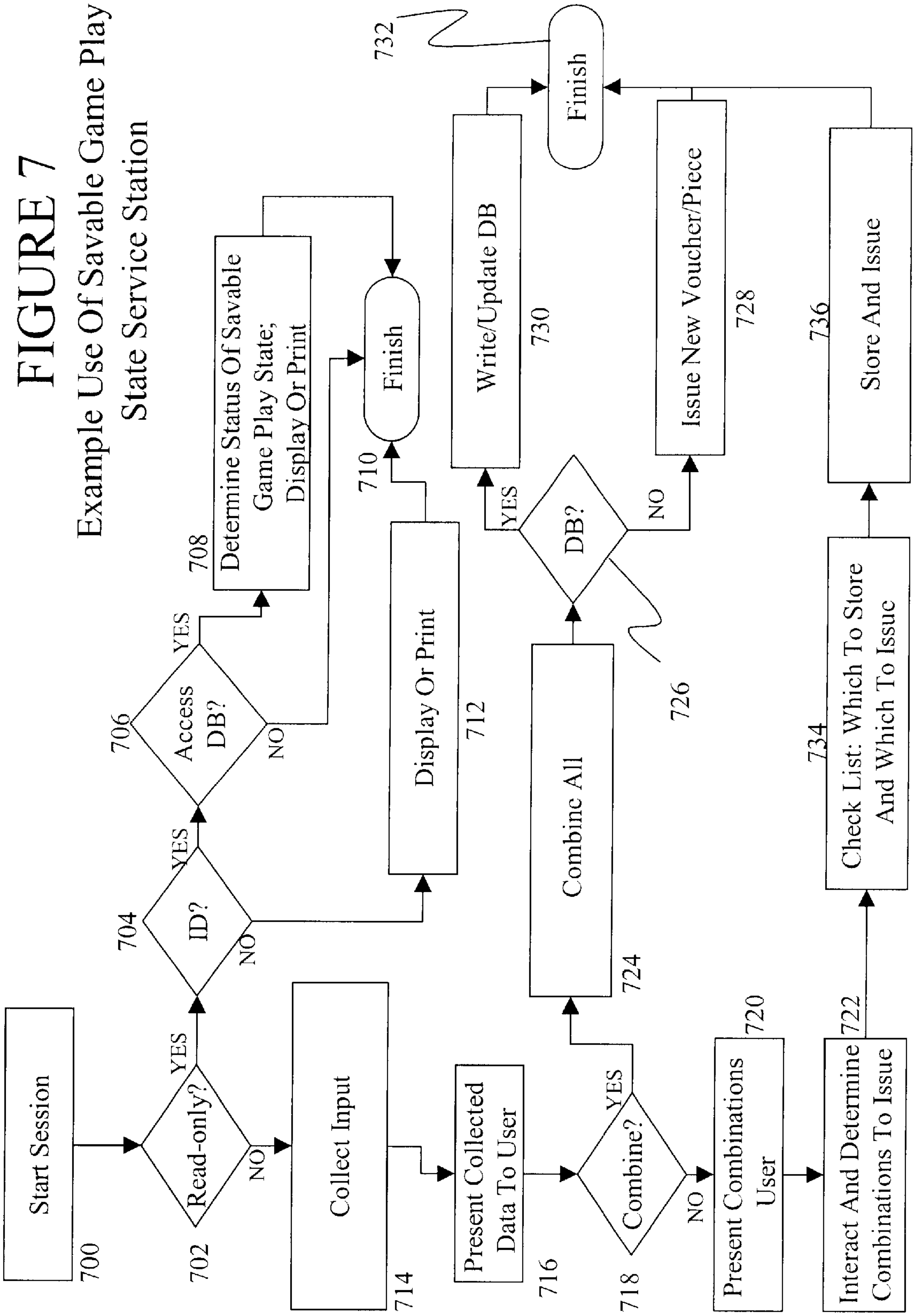
FIG. 7 is a flow diagram of a service station in accordance with the present invention

FIG. 4 shows typical infrastructures for the present invention in casino environments. Network 402 connects backend system 400 having a game play event saving/retrieval, database thereon. System 404 is expected to be a typical installation, having a remote game controller (RGC) 406 connected to the backend system on one side, and gaming machines 408*a* through 408*x* on the casino floor on the other (note: this is representative—there will be a plurality of RGCs controlling banks of gaming machines). In this configuration, a preferred embodiment will enable individual player terminals to both read and print game play state vouchers, originate game play state vouchers, as well as using the backend server system having a database to confirm (verify) each state to be saved and then later, retrieved.

System 414 is different than system 404 in not having an RGC. It is expected that in the future, many smaller casinos will have a server 400 networked directly to each player terminal 412*a*–412*x*. RGC functions will move to the server, as networking technologies enable networks having the bandwidth to handle all the traffic associated with a floor of gaming machines (player terminals).

System 410 is a non-networked system, a preferred embodiment for smaller casinos. As discussed above, the savable/transferable game play states of the present invention may be used between individual, non-networked player terminals. Each player terminal will be equipped with the preferred method of reading and saving machine play state as specified by the casino. It is expected that one of the most common systems will use vouchers, such as those shown in FIG. 3.

During game play, a player will invoke (win, as determined by the results of game play) an enhanced game play state. The enhanced game play state will depend on the game and what is implemented (enabled). For example, a reel-based slot may have reel nudges, reel holds, and respins enabled, but would not have card holds. Alternatively, a video poker game would have card holds but not reel holds, reel nudges, or respins. Both games could have bonus game invocation, bonus game multipliers, and changeable pay tables.

After invoking the enhanced game play state, a player may choose to save it for later use (usually on a different machine), or use it now. If the player chooses to save the savable, transferable game play state, then the state manager will translate the currently invoked enhancement into an internal machine state indicator, the game will be put back into a base state (non-enhanced play), and finally the state manager will cause a voucher to be printed with machine readable indicia thereon, the machine readable indicia having a description of the enhanced play therein (game, game type, or game family and the enhanced play).

As with any of the player terminals shown in FIG. 4, the player may later insert a voucher having saved, transferable enhanced game play state thereon. The state manager will first check if the game play is applicable to the gaming machine; if not, the voucher is returned to the player. If it is, the preferred embodiment will have a small display area (using an LCD screen, a portion of the main video screen if there is a main video screen, or a set of symbols that can be backlit) that indicates which enhanced play states are available to the player. The player, while playing the machine, may use up any of their available enhanced game play states by using an input device (typically a button on the play area, or a touch screen button near the enhanced game play to be used). The signal from the input device goes to the state manager, which then sets the game state accordingly as soon as possible. For example, that if a player invokes reel nudge, it will be set to be used immediately, but if the player invokes a changes pay table, it will be invoked at the start of the next game play if the game is not already between plays. The correct timing of the application of the invoked enhanced game play holds true for any game state change, coming from a voucher or a backend system.

FIG. 5 illustrates some of the enhanced game play states that can be saved by a player according to the present invention. A player may save and use later, or transfer to a different machine: added paylines (not normally available during regular game play); bonus play enhancements (i.e., the ability to enhance a bonus game even further once invoked using pay multipliers, added winning stops, etc.); bonus play invocation (enter a bonus play at will); changeable pay tables (higher payouts) for the primary game, the secondary game (if any), and any bonus games; a hold-card ability; a hold-reel ability; individual payline multipliers; reel nudges, both up and down; respins or redraws; the ability to substitute one symbol for another for a spin; and, wild symbol enablement for a spin or set of spins. As stated earlier, this list of savable and transferable enhanced game play state is expected to grow as savable/transferable game states become implemented on games currently in development, rather than being retrofitted to existing games.

To keep the illustrations from becoming overly complex, ID readers have not been illustrated. However, it is to be fully understood that in casinos where the games are networked will have ID readers. ID readers may be the traditional mag stripe card type readers, but may further include extracting temporary player account information off of vouchers (encoded in the machine readable indicia thereon), and may further make use of any player-carriable means such as a handheld device having an IR or RF interface to the game device or component station. If such an electronic or voucher ID is used, stored enhanced game play state associated with the ID is extracted from the backend system having a database.

Voucher IDs are intended to be used by people who may be at a casino for more than a brief time, but who do not want to be entered as "players" in the casino's database (typically used by casinos for player tracking purposes and by players to be awarded player tracking points). This may include people who want to play a series of games over an evening or a week, want the convenience of having some gaming data kept on a back-end database, but do not want to give the casino their personal data. The player may chose to use a voucher ID, which is simply any media on which a unique identifier is recorded (typically an alpha-numeric sequence). This may include a card with a magnetic strip, smart card, bar-coded voucher, or any other form of readable media that can easily be carried by a person. Savable/transferable enhanced game play state can now be associated with the "voucher ID" rather than a traditional player's card. Typically voucher IDs would be given limited life spans, specified by the holder or establishment.

Voucher IDs are one example of anonymous player IDs, which allow players and casinos to make use of many of the features of a traditional players ID, but also allow player anonymity. Any of the above described ways that enable a player to provide an account designator to a game machine or component station may be used; it is expected that the voucher ID form will be the most used.

Figure 9:
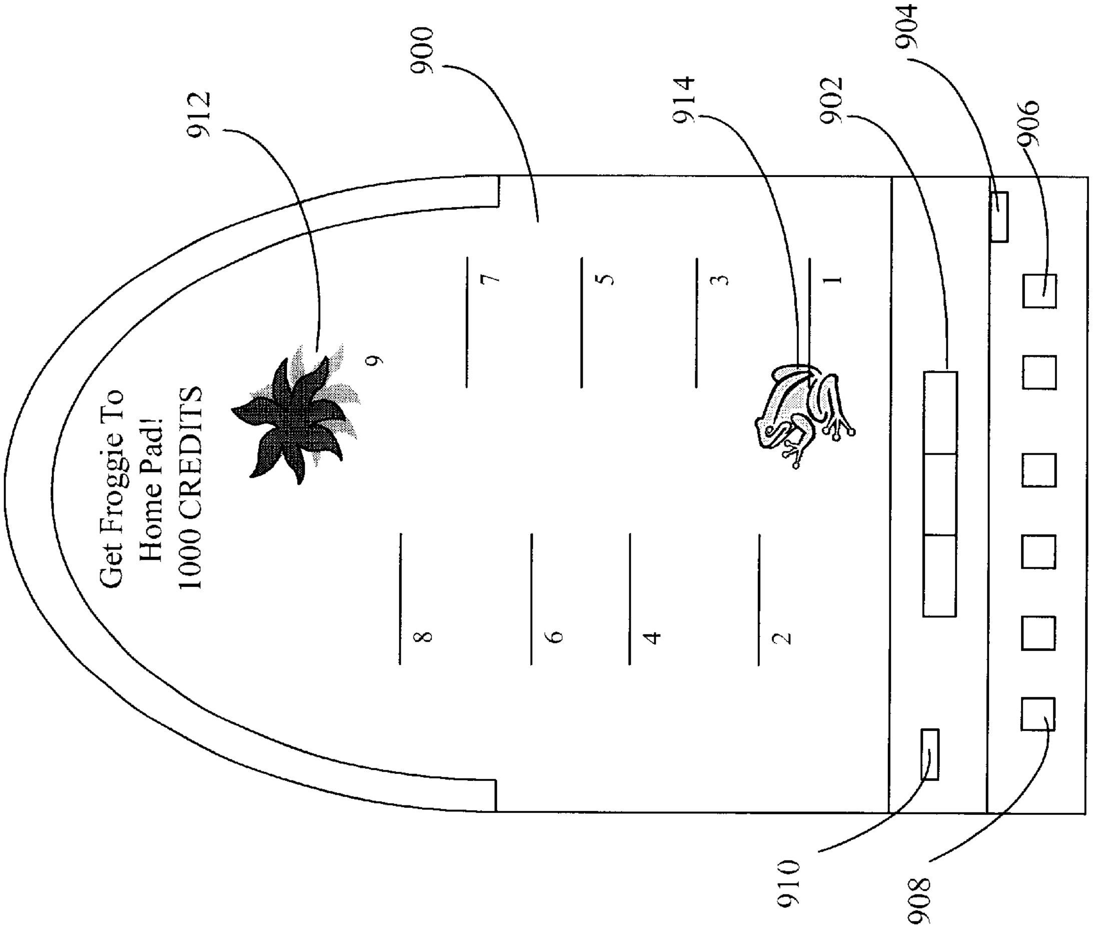
FIG. 9 is an illustration of a game state saving game for use with the present invention.

Looking at FIG. 9, when playing the primary game there will be game events occurring in the primary game that will trigger the secondary game. In this example, the secondary game is the "Froggie" game. Each time the secondary "Froggie" game is invoked by the primary game, frog 914 will advance up one step. The secondary game starts at step 1 (the steps are labeled). After 7 invocations frog 914 will be sitting on step 8. With one more trigger of the secondary game, the player will get the frog to its home pad 912 (step 9) and will be awarded 1000 extra game credits. Alternatively, the number of steps the frog advances on each secondary game invocation can be partially determined by the indicia shown on the primary game, allowing for more than one "hop" per invocation.

The player has the option of saving the state of the game at the start of each primary game play. In this example, the state saved would be the state of the secondary game, specifically the frog's current step location. If the player plays "Froggie" enough to advance frog 914 to step 5, the player may touch button 906, the "save state" button, and receive a print-out in the form of a voucher from output slot 904. Immediately after saving the game state to a voucher, the game resets itself to the base state, with frog 914 back on step 1. The player may now leave the game for a while and come back, inserting the previously generated voucher into slot 910. The game will set itself to the state saved, in this case placing frog 914 on step 5. The game is now ready to be played.

Typically the game state just recovered will be available for a fixed length of time, perhaps 3 minutes. The game must be played within that allotted time or the game reverts to its start state and the game state voucher value is lost. If the player inserts the game state voucher and decides not to play the game, the voucher can always be recovered by pressing the "save state" button before the allotted time is up. Although discussed in terms of vouchers, any read/write media may be used in addition to having all the game state data stored in a back-end database, accessed by an ID card, PIN, ID voucher, etc. All such methods of saving game state are fully contemplated by the current invention.

The advantages of saving game state are increased interest in investment bonus games by the players. With the ability to save their state, players who must leave without having reached the winning secondary game state have a much higher incentive to return and continue playing.

Figure 10:
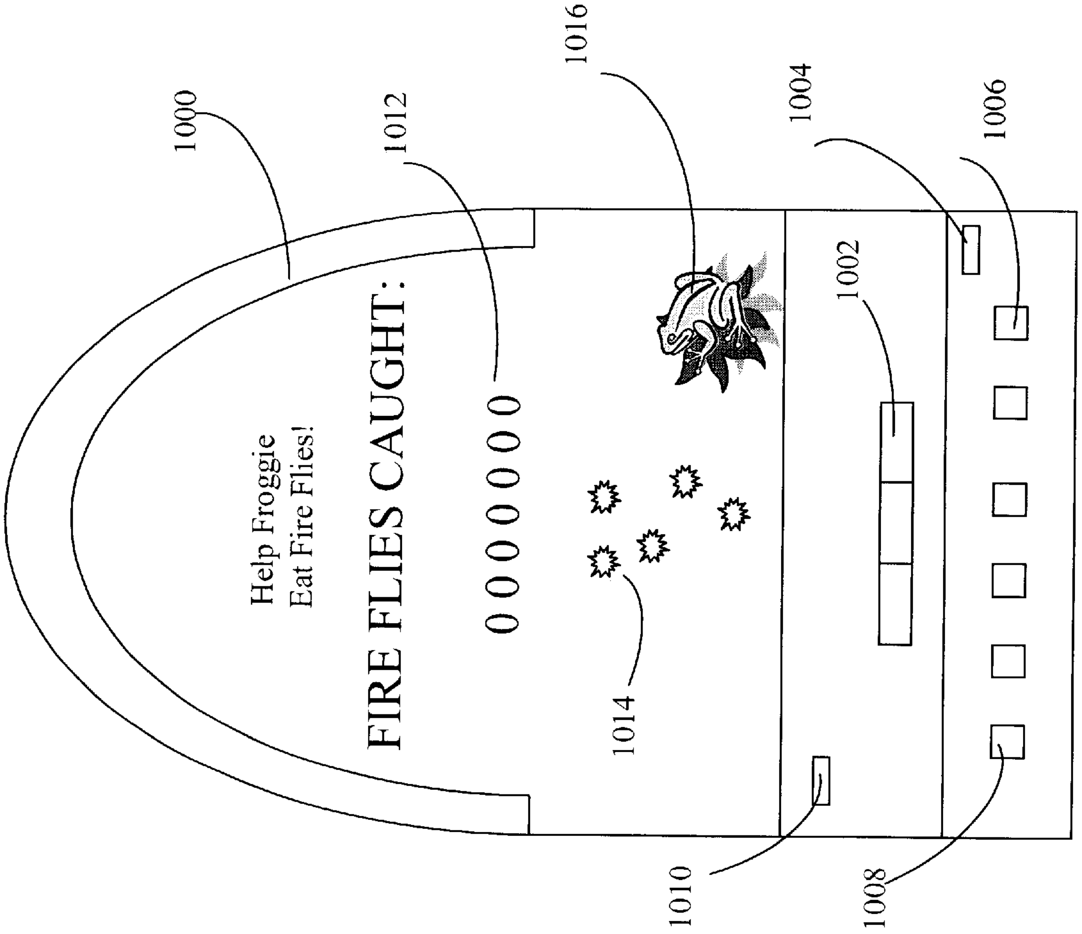
FIG. 10 is an illustration of a game state saving game having skill elements for use with the present invention.

In addition to saving game state associated with bonus games, game state may be saved on a secondary game involving some skill element. An example of this type of game state is shown in FIG. 10. In gaming device 1000 there is a primary game, indicated with indicia windows 1002. The primary game may be any game of chance or a fixed-pool game, including but not limited to poker, keno, reel-games, etc. Buttons shown between 1006 and 1008 are used to play the primary game in its known manner. Also included is input slot 1010 for reading any convenient input form that may be used to record game state. This includes but is not limited to vouchers, magnetic strip cards, smart cards, player IDs, ID vouchers, etc. Output slot 1004 is used to give any form of game state saving media to the player on request, typically some form of voucher or magnetic media. Button 1006 is used for secondary game play; button 1008 is a "save state" button that directs the gaming device to save the current state of the game. All this is shown for illustrative purposes only and can take a plethora of functionally equivalent forms, including configurations with just a single game.

In this case, when the secondary "Froggie" game is triggered or invoked from the primary game, the player can play the game for skill points. Frog 1016 has a tongue (not shown) that can be extended by pressing button 1006. A plurality of "fireflies" shown as 1014 are flying near frog 1016. A player presses button 1008 when a firefly is in line and near the frog's mouth, getting points thereby. The player accumulates points that are recorded on the screen at 1012.

When the player needs to leave the machine for a time, the player has the option of pressing "save state" button 1006 and saving the game state of the machine that can be saved—in this case, the players score on the secondary game. The player will be issued a voucher from output slot 1004 on which is recorded the game state. When the player returns later, the player inserts the readable media into read slot 1010 and the game will reset to the saved state.

In a preferred embodiment, the saved game state will also have an expiration date associated with it. The idea is to encourage a player to maximize their skill point score within a specified period of time (thereby encourage game use in general during the same period). The expiration time picked would depend on the game type, the player's average stay, as well as other factors, but would typically be in hours or days.

In addition to carrying information on saved game state for one gaming device, it is fully envisioned that the current invention will encompass the saving of game states for multiple games on a single bearer instrument such as a voucher. If the game state is being saved in a back-end database, this is the straightforward association of one player ID or voucher ID with multiple game state records, where the game state records include fields identifying the gaming device to which the saved state applies. For bearer instruments such as vouchers, multi-game, multi-state vouchers will be issued. As discussed above, although vouchers are being used as an example of bearer instruments, any form of read/write media suitable for use as a bearer instrument is within the scope of the present invention.

Figure 8:
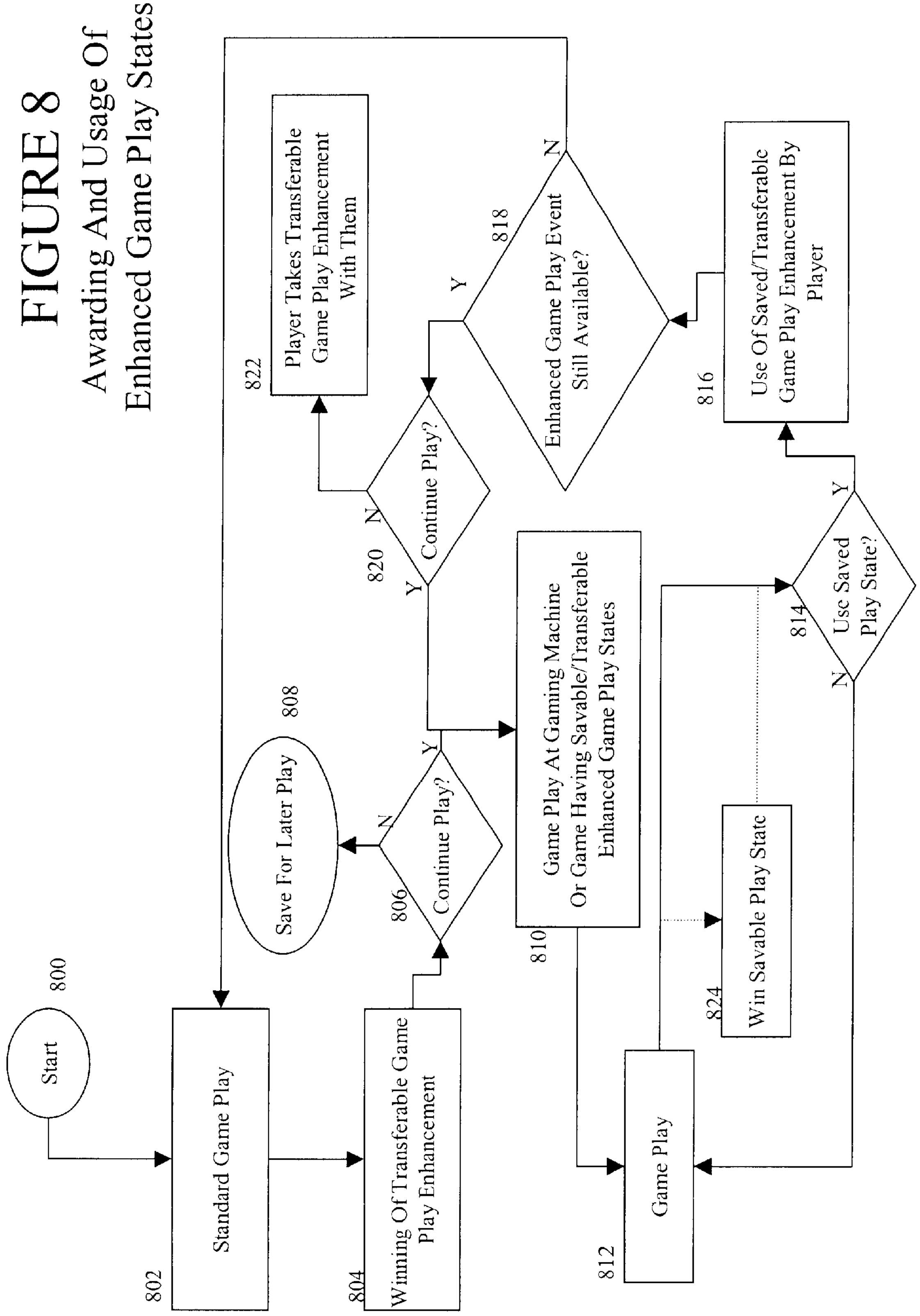
FIG. 8 is a flow diagram showing use of savable game state according to the present invention.

It is envisioned that casual players may well end up carrying multiple instruments after a while. To help them, as well as provide other related services including advertising and special promotional offers, a game state service station (service station) is provided in a preferred embodiment. FIG. 8 shows a functional block diagram of a service station. Because the complexity of the interaction at the service station is relatively high, a preferred embodiment will have a minimum number (if any) "hard" buttons, shown generally as buttons 808. These hard buttons may provide a few preliminary choices, such as screen display only, print-only, and read-out only functions (read-only functions are provided for people who forget what a voucher has on it—it provides an English, Spanish, Japanese, or other language translation of what the instrument has on it, and then returns the instrument without further processing). An implementation using hard buttons may be preferred if the service station has limited capabilities; for example one that only provides reading services and nothing else.

Service stations will also have at least one input slot, shown as 804, and may have more than one. A minimal configuration will have an input slot for vouchers. Optional slots may be for magnetic cards, smart cards, player's cards, and related instruments carried by people. There will also be at least one printer output port, shown as 806. Also shown is a video display 802, further being a touchscreen for user input. Service station 800 will preferably be connected to the establishment's or casino's back-end database 812 via a LAN 810 or functionally equivalent means. Being connected to a back-end database is optional; a subset of the service station's primary functions can still be carried out without the connection, and in some installations (for security or other reasons) it may be desirable to have one or more service stations installed unconnected.

The functionality provided by the service station is geared towards helping users (players) manage and understand any and all game play state they may have. This will be especially helpful to occasional users who do not play enough to "memorize" the meaning of the various instruments and awards. The user starts a session by pressing a hard button for certain limited functions, or inserting any applicable instrument in its' respective slot (i.e., player's card in a player card slot, voucher in the voucher reader slot). This action corresponds to entry box 700 in FIG. 7.

The user initially decides if they want a read-only session at decision diamond 702. If the answer is yes, the "YES" exit is taken to decision diamond 704. If the user has presented a form of ID to the service station (rather than some form of saved game play state), the "YES" exit is taken from decision diamond 704 to decision diamond 706. If the service station can access a back-end database and the ID is recognized, the "YES" exit is taken to box 708. Action in box 708 includes asking if the user wants a display or a print-out, and then providing the user with the current state of any saved game play states in the back-end database associated with the ID presented. Box 708 is then left and the process finishes at finish 710.

If, at decision diamond 706, the ID was not recognized the process finishes immediately at finish point 710 (with a polite message to that effect on the screen, of course!). If, at decision diamond 704, the user presented something other than an ID the "NO" exit is taken and box 712 entered. Action taken in box 712 is to ask if the user wants the information in hardcopy or video form, present the information to the user in that manner, return the instrument to the user, and proceed to finish the transaction at finish 710.

If, at decision diamond 702 the answer was "NO", the user wants to do something more than have something read. The "NO" exit is taken to box 714. Action taken in box 714 is to collect any and all saved game state data from or associated with the user, using vouchers and/or data stored on a backend system. If the user requests information from a back-end database, the user has to provide an ID. The ID can take any form, from a voucher ID to a player's card to a PIN. The user is then asked to submit instruments until they have no more (i.e., vouchers). Once the user indicates to the service station all sources of credits has been accumulated, the service station combines like data and reaches a total. Combining like data consists of combining the saved game states that are for the same game (or game type) and the same enhanced game play (i.e., reel-hold for 5-reel slots). Box 714 is left and box 716 is entered.

Actions corresponding to box 716 are to present to the user (typically on an on-screen display) the game states the player has currently saved, and that are not expired. As before, the user may choose hardcopy or video output. Box 716 is then left for decision diamond 718.

In decision diamond 718 the user is asked if they want to combine saved game play states that are combinable, and re-issue the rest in as compact a form as possible. If the answer is yes, the "YES" exit is taken to box 724. The action taken in box 724 is to do the combinations possible, remove redundant or expired credits, etc. These calculations may be done in the service station or in a back-end server in a networked environment. Box 724 is then left for decision diamond 726.

At decision diamond 726 the user is asked if they want to store the information on a back-end database or if they want the credits re-issued to them in an instrument form, typically vouchers. If the answer is yes to the back-end database storage, the "YES" exit is taken and box 730 entered. Please note that if the service station in use is not networked, clearly the "NO" exit is taken from this decision diamond.

In box 730, the back-end database determines if the current user has an ID. If they do, the data is recorded in records associated with that ID. If not, the user is issued a voucher ID or equivalent and the data is then stored on the database using the newly issued ID. The process finishes by then entering finish 732.

If the user indicated no at decision diamond 726, then the "NO" exit is taken to box 728. The action taken is to issue a new voucher to the user that incorporates all the valid credits listed for the user, included any combined credits. The process then finishes by leaving box 728 and entered finish 732.

If, at decision point 718 the user answered no, the "NO" exit is taken to box 720. Action taken in box 720 is instruct the user on possible combinations. For example, a user may want a separate saved game states onto multiple vouchers (to give to a friend to use). Any combination of vouchers may be created for the user. Box 720 is left and box 722 is entered.

Action in box 722 is to put up interactive screens and determine the combination of vouchers the user wants the service station to produce. After determining a set of vouchers equal in value to the credits and vouchers presented to the service station at the start of the session, box 722 is left and box 734 entered.

The action in box 734 is to present a list to the user of the newly combined game states, and ask which are to be stored in a back-end database and which are to be issued as newly generated vouchers. The user indicates which are to be stored and which are to be issued in voucher form. Box 734 is left and box 736 entered. The action taken in box 736 is to store and/or issue the vouchers the user requested. As with box 730, if the user currently has no ID for the database and requested some of the newly recombined credits or game states be stored on a back-end database, a voucher ID or equivalent will be given to the user at this time. The process now exits box 736 and finishes by entering finish 732.

FIG. 8 shows an example use of enhanced game play states. Starting at start point 800, a player starts play at a player terminal (game machine). Box 802 is entered, corresponding to playing at a game where the player has no saved (or applicable saved) game play state. Play continues until the player wins an enhanced game play state, leaving box 802 and entering box 804. In addition to winning an enhanced game play state, the box corresponds to the enhanced game play state being savable. Box 804 is left and decision diamond 806 is entered.

The decision made at 806 is to continue play at this game at this time. If the answer is no, the "N" exit is taken to end point 808, with the player being issued a voucher having the saved game play state in machine readable format thereon. End point 808 corresponds to the player saving the voucher until a later time. Note that instead of issuing a voucher, the savable game state may have been stored on a backend system in a manner associated with the player.

If, at 806, the answer was to keep playing, then the "Y" exit is taken to box 810. The actions corresponding to 810 include the continuing play at a gaming machine enabled for use of savable, transferable game play state. Note that this may well be the same game machine the player used earlier in the process, or may be a different machine. Box 810 is left and box 812 entered.

The actions corresponding to 812 include the start of game play. Box 812 is left and decision point 814 entered, where the player decides if they are going to use any available saved game play state. If not, the "N" exit is taken and box 812 is re-entered, where play continues. Box 812 and decision point 814 form a continuing loop until the player decides to make use of saved game play state. At that point, the "Y" exit is taken from decision point 814 and box 816 entered.

The actions corresponding to 816 are those associated with the player indicating which saved play state to use, and the game machine being set into that state. Further, that savable game state is now used, so is subtracted from saved game state available to the player. Finally, game play starting from the non-base-state continues, the saved game play state now being used. Box 816 is left and decision point 818 entered.

818 corresponds to detecting if the player has any saved game state left. This will typically be done in the player terminal by the state manager. If there is no remaining saved game play state, the "N" exit is taken and box 802 entered, where the player continues to play regular play. If there is saved game play state remaining, the "Y" exit is taken to decision point 820. There, the player decides if they want to keep playing or not. If the player wishes to keep playing, then box 810 is entered, where play continues.

Box 824 is an action that may occur in parallel to decision point 814 during game play (812). If, during game play, the player enters an enhanced game play state that is also a savable game play state (not all enhanced game play states will be savable—each enhanced game play state may be set as savable or not by the casino in which the game is installed), 824 is entered. Conceptually the savable game state is considered temporarily saved. Decision point 814 is now entered, where the player may either use of save (not make use of) the savable game state they entered. If the player decides to use it, the process continues to box 816. If not, play continues with box 812.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Accordingly, it will be seen that this invention provides a system and method for maintaining player's enhanced game play states not directly associated with credits or prizes (although they may lead to the player winning more prizes or credits). The savable game states may be saved on a game state voucher or any other media-based implementation or may be saved in strictly softcopy (electronic means) form. Any savable game state, in whatever form it is stored, comprises savable game state. The saving of game states provides for the promotion of continued play in a gaming environment.

A player may restore savable/transferable game state from previously played games when the previously played games are the same game device or from a similarly constructed game or any game with equivalent results or states. For example, saving the bonus game state of "Froggie" in FIG. 12 results in a voucher (or other instrument, or data in a database) that may then be used in any game where the secondary bonus game is triggered by the primary game with the same probability (pay tables establishing the same likelihood of incrementing the secondary or bonus game) coupled with a bonus that game that has 9 incremental states to win.

Although the description above contains much specificity, the description should not be construed as limiting the scope of the invention but as merely providing an illustration of the presently preferred embodiment of the invention. The scope of this invention should be determined by the appended claims and their legal equivalents.

What is claimed is:

1. A gaming system comprising:

at least one game device configured to allow at least one player to play at least one game, where each of said at least one game device further comprises:

a game state manager operably disposed within said game device and in communication with said at least one game, configured to receive savable game state from said at least one game and set savable game state in said at least one game, an input device in operable communication with said game state manager, configured to receive savable game state data, and, an output device in operable communication with said game state manager, configured to output savable game state data; and, at least one service station further comprising a player-visible service station display, at least one service station input device operably disposed within said at least one service station, at least one service station output device operably disposed within said at least one service station, and, configured to receive saved game play states, combine game play states, separate game play states, and save game play states.

2. The gaming system of claim 1 where at least one of said at least one service stations is operably embedded in an enclosure, said enclosure further containing at least one of said at least one game devices.

3. The gaming system of claim 1 where said service station display and said at least one game share at least one player-visible display, and where said input device and said at least one service station input device share a physical device, and where said output device and said at least one service station output device share a physical device.

4. The gaming system of claim 1 where said service station input device is configured to receive only vouchers, and where said player-visible display is configured to display natural language translations of vouchers received in said input device.

5. The gaming system of claim 1 where said service station input device is configured to receive electronic data, where said electronic data further comprises savable game state data.

6. The game device of claim 1 where said service station input device is configured to receive a player ID and further configured to retrieve any savable game state data from a database, where said retrievable savable game state data is correlated with said player ID.

7. The gaming system of claim 1 where at least one of said at least one gaming device further comprises at least one game further comprising a primary game and a secondary game, where said primary game is based on one of chance or a fixed pool, and said secondary game is invoked by the occurrence of at least one predetermined event in said primary game, and where said savable game state is derived only from said secondary game.

* * * * *